Oct. 18, 1927.
M. LIPTAK
1,646,097
REENFORCED GLASS
Filed Feb. 28, 1927
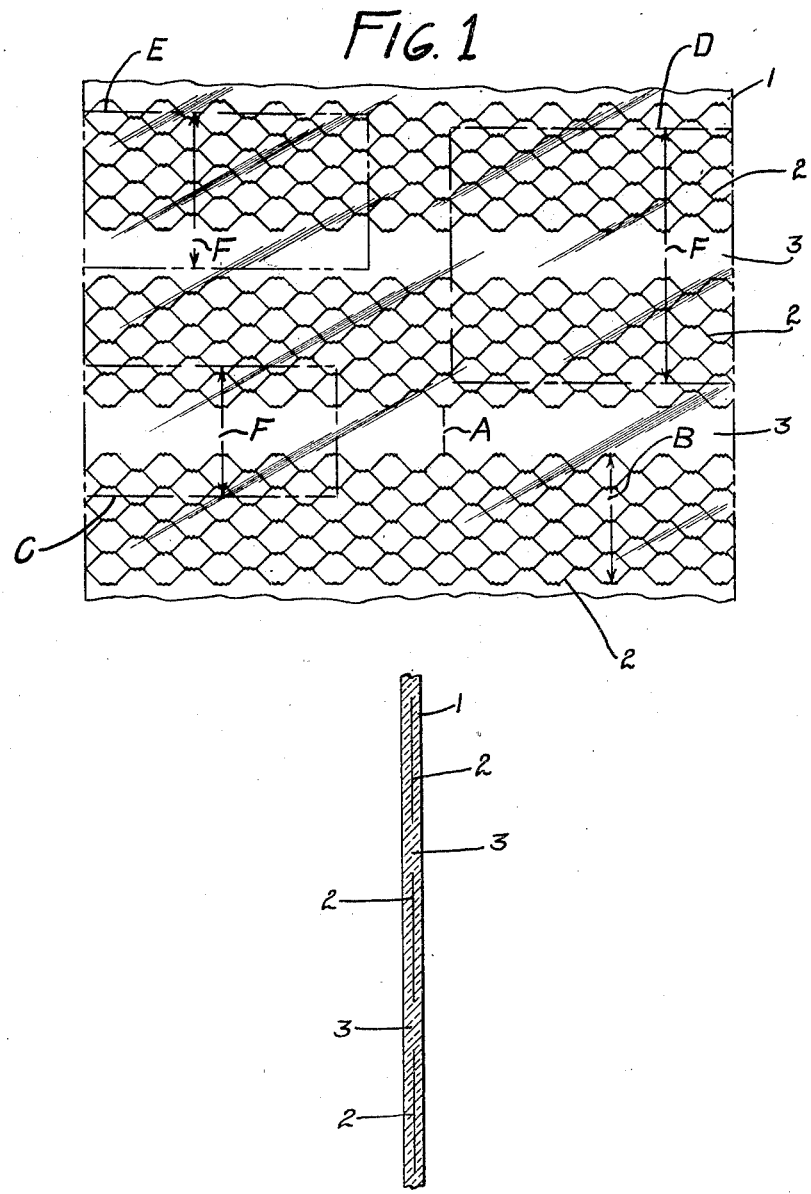
INVENTOR
MICHAEL LIPTAK
By Paul, Paul & Moore
ATTORNEYS Patented Oct. 18, 1927.

1,646,097

UNITED STATES PATENT OFFICE.

MICHAEL LIPTAK, OF ST. PAUL, MINNESOTA.

REENFORCED GLASS.

Application filed February 28, 1927. Serial No. 171,545.

This invention relates to improvements in reenforced glass, and to the method of placing the reenforcement in the glass.

The device provides a means whereby the reenforcing material is so arranged that adequate reenforcement of any desired area is obtainable, while at the same time an unreenforced clear vision area is provided which may be at a point intermediate two reenforced areas, or at one side only of such reenforced area.

An object is to so dispose the reenforcing material, that smaller sections of reenforced transparent material of any size can be conveniently cut from a section of larger size, so that the cut out section provides, if desired, a pane of glass having two strips of reenforcing material, extending inwardly from opposite edges, with the strips spaced and substantially parallel, to provide an unreenforced clear vision area therebetween. The clear vision and reenforced areas are strip-like and are parallel. Thus, when the glass is set in its frame, some reenforcing material may be had at the top and at the bottom of the window, or at the top only, or at the bottom only.

This device and method are particularly adapted for use on public carriers, such as automobiles, street cars, etc., and is also well adapted for use in the manufacture of windshields, in all of which uses sufficient reenforcement is provided to prevent flying of the glass in case of breakage, while at the same time clear and unobstructed vision can be had, arranged at any convenient level.

Features of the invention include the method of arranging the reenforcement to obtain the above mentioned results, as well as the article produced by the method.

Advantages of the device will be set forth in the description of the drawings forming a part of this application and in said drawings.

Figure 1 is a face view of a section of glass reenforced in accordance with the teachings of my invention; and Figure 2 is a cross section.

Numeral 1 designates the large sheet or section of glass, or like material, and the numeral 2 strips of reenforcing material, while the numeral 3 indicates the unreenforced or clear vision area.

The reenforced glass herein shown is made up in large sections 1, having strip-like reenforcing material 2 embedded therein, with the strips parallel and spaced apart to form the clear vision area 3. As herein shown, the distance A between the parallel reenforcing strips is greater than the width B of the strips. It will be understood, however, that the widths of the reenforcing strips may vary as well as the widths of the clear vision space between the strips, and it will be further understood that in a given section of glass 1, the widths of all reenforcing sections may not necessarily be the same. This will also be true of the widths of clear vision areas. By this arrangement, it will be seen that smaller sections represented respectively by dot-and-dash lines C, D, E of varying dimensions, in direction F, as well as in a direction lengthwise of the strips, can be cut so that varying amounts of marginal reenforcement may, in some instances, be provided at opposite sides, which sides when the glass is in the window are arranged at the top and bottom of the window, to provide an unreenforced clear vision space or area 2 intermediate the reenforced top and bottom areas. It will be understood that it is not necessary that reenforcing materials or strips be of equal width at the top and bottom, and it will be further understood that two areas, respectively reenforced and clear vision, only may be provided as indicated at E in Figure 1. The relative widths of these areas may also be varied. It may be advantageous to have more reenforcing material at the top than at the bottom or vice versa. It will, however, be seen that smaller pieces of glass may be conveniently cut from the larger section 1 in almost any combination of reenforced and clear vision areas.

I claim as my invention:

1. A section of transparent material having strips of reenforcing material embedded therein, the strips being spaced to provide an unreenforced clear vision area.

2. A section of transparent material having parallel strip-like reenforced and unreenforced portions forming alternating strip-like areas.

3. A section of transparent material having parallel strips of open wire reenforcing material embedded therein, the strips being spaced to provide an unreeinforced clear vision area.

4. A section of transparent material having strip-like reenforced and unreenforced portions forming alternating strip-like areas, the reenforced areas being greater than the unreenforced areas.

5. A section of transparent material having parallel strips of open wire reenforcing material embedded therein, the strips being spaced to provide an unreenforced clear vision area, the area of the reenforced portion being greater than the area between the reenforced portions.

6. A section of glass having alternate reenforced and unreenforced areas arranged to permit the severance therefrom of smaller sections of varying size, so that each section may have an intermediately disposed unreenforced area flanked by reenforced areas.

7. A section of transparent material having alternate reenforced and unreenforced areas arranged to permit severance therefrom into smaller sections of varying size, to provide sections having either an intermediately disposed unreenforced area flanked by reenforced areas or having only reenforced and unreenforced areas.

In witness whereof, I have hereunto set my hand this 25th day of February 1927.

MICHAEL LIPTAK.